(12) United States Patent
Abdollahi et al.

(10) Patent No.: US 11,506,588 B1
(45) Date of Patent: Nov. 22, 2022

(54) AIR QUALITY METER

(71) Applicant: HavaTell Inc., Toronto (CA)

(72) Inventors: Mostafa Abdollahi, Tehran (IR);
Farzam Keshavarzi, Tehran (IR);
Mehrdad Hooshmand, Tehran (IR);
Hossein Varmazyar, Tehran (IR);
Mojtaba Falahatinezhad, Maple (CA)

(*) Notice: Subject to any disclaimer, the term of this patent is extended or adjusted under 35 U.S.C. 154(b) by 0 days.

(21) Appl. No.: 17/738,889

(22) Filed: May 6, 2022

(51) Int. Cl.
*G01N 15/02* (2006.01)
*G01N 15/06* (2006.01)
*G01N 15/10* (2006.01)

(52) U.S. Cl.
CPC ......... *G01N 15/0227* (2013.01); *G01N 15/06* (2013.01); *G01N 2015/025* (2013.01); *G01N 2015/0693* (2013.01); *G01N 2015/1087* (2013.01); *G01N 2015/1093* (2013.01)

(58) Field of Classification Search
CPC ... G01N 2015/1093; G01N 2015/1087; G01N 2015/025; G01N 15/0227; G01N 2015/0693
See application file for complete search history.

(56) References Cited

U.S. PATENT DOCUMENTS

| 7,162,057 B1* | 1/2007 | Roth | G01N 15/0227 137/13 |
| 7,218,775 B2 | 5/2007 | Kokko et al. | |
| 7,605,919 B2 | 10/2009 | Oma et al. | |
| 9,488,575 B2 | 11/2016 | Kim et al. | |
| 2015/0355084 A1* | 12/2015 | White | G01N 15/1434 506/35 |
| 2016/0048009 A1 | 2/2016 | Sharifi | |
| 2016/0290912 A1* | 10/2016 | Kent | G01N 15/0612 |
| 2018/0143182 A1 | 5/2018 | Wanders et al. | |
| 2018/0189963 A1* | 7/2018 | Joly | G03H 1/0443 |
| 2021/0300153 A1* | 9/2021 | Porter | B60H 3/0608 |

* cited by examiner

*Primary Examiner* — Paul M. West
(74) *Attorney, Agent, or Firm* — Nasser Ashgriz; UIPatent, Inc.

(57) ABSTRACT

A portable air quality monitoring device is disclosed that can identify the type of particles in the air. This device takes images of particles in the air and compares them with a library of particles in its memory to identify the type of particles. The device has a housing that draws ambient air into the system and takes microscopic images of the flowing particles and droplets using flash photography. The device can be stand alone or can connect to the back of a mobile phone and use the mobile phone camera and light. People can upload their local air quality data online for all to see the local air quality.

3 Claims, 7 Drawing Sheets

AIR QUALITY METER

FIELD OF THE INVENTION

The present invention relates, in general, to air quality monitoring systems, and in particular, to an imaging-based particle recognition system.

BACKGROUND OF THE INVENTION

Air quality is one of the most important factors affecting health, productivity, and learning ability. Air quality can significantly affect people with chronic lung conditions, like asthma and COPD. Pollens and other particles can trigger their symptoms. In addition, viruses (such as Corona virus) are known to transmit through droplets that are generated by an infected person, when talking or coughing. These droplets are mainly spherical and have diameters of larger than 5 μm.

A handheld device that can check if there are significant amounts of particles and droplets in the air would indicate the air quality. Air quality monitoring is performed by a variety of instruments, depending on what is being measured. To measure hazardous gases and chemical, gas analyzers are used. The air samples are sent to a laboratory that is equipped with gas analyzing machines to identify the gases and chemicals in the air. Because the gas analyzing machines are large and quite expensive, this test is not performed on location. Similarly, if the morphology of the particles in the air are needed, the air sample is sent to a laboratory that is equipped with particle morphology equipment to identify the particle. Particle morphology devices use imaging to identify the particle.

Portable air quality monitoring devices mainly count the number of particles in the flow. If the number of particles is large, the air quality is noted as poor, otherwise it is good. These handheld devices can immediately provide particle counts in the air. These devices work by using a laser to count the number of particles in the air, or by using electrochemical sensors to detect gaseous compounds. A particle counter operates by pumping an air sample past a laser beam. A particle in the air scatters the laser light. A photodetector senses the scattered light and generates an analog electrical signal. The signals are analyzed to determine the particle size and count.

None of the currently available handheld air quality monitoring devices can distinguish the type of the particles in the air, they only measure the number, the sizes, and the chemical composition the particles. In addition, the currently available air quality measurement devices cannot differentiate liquid droplets from other particles. There is no existing solution for the general public to attain the quantity of droplets in ambient air. The present device uses direct imaging and an image recognition software to identify the particles. It can identify the particles in the air by comparing them with a library of particles in its memory. It has a user interface to interpret environmental data and tell the user if the environment is safe or not.

The present device is designed to determine the type of the particles, if it is a solid or a liquid, and if it is a solid, what type of particle it is. The present device is aimed at detecting potential for air born particles and water droplets as a catalyst for virus transmission, and thereby prevent asthma attacks and reduce disease transmission through warning people of unsafe environments.

SUMMARY OF THE INVENTION

A new handheld device is disclosed that not only provides the air quality information regarding the number of particles in the air, but also it identifies the types of particles in the air. It can distinguish a liquid droplet from a solid particle, a dust from a pollen, a synthetic fiber from a metal particle, etc. This device uses a fast image processing system that is trained to rapidly recognize a set of predefined particles. An application software is also developed to show all the measured and analyzed data on the user's phone for easy access. This portable device can measure the size and number of the droplets and particles in an air space. The number of particles/droplets in the air is used as an indicator of the air quality. The device comprises of a fan that takes in an ambient air into the device. The air passes through a narrow channel inside the device while microscopic images are taken. The images are processed by an image processing system and are compared with a library of images in the device to identify the type of particles. The image processing also counts the number of the particles and determines their sizes.

The present device provides particle morphology. The device has an automated image analysis system and trains to identify specific particles. Machine learning technology has allowed the image processing and image recognition process to be done in a fraction of a second. This allows the system to immediately identify the particle and report to the user. The device can be paired with a mobile phone, and uses its GPS system to show the air quality throughout all geographical locations and places of interest to people.

The device can also identify if the particles are water droplets or solid particles. The higher the number of airborne droplets, the higher the chances of inhaling infectious particles. In one embodiment of the present invention, the device pairs with a mobile phone and all the data are shown on an App that is installed on the phone. In another embodiment of the present invention, the device has its own monitor and can be used as an independent device. In another embodiment of the present invention, the device can attach to the back of a mobile phone and use its camera and light. One objective of the present invention is to sample ambient air and measure the quantity of liquid droplets. Another objective of the present invention is to have a device such that the readings should be instantaneously visible to the user so they can monitor environments in real-time. Another objective of the present device is to provide a portable device for use anywhere. To perform these functions, the device samples ambient air and analyzes samples to quantify the droplets within. The device can be connected to a smartphone or have its own display to present results. It is also configured to be inexpensive since the client intends to commercialize the device. Another object of the present invention is to allow people know if the air quality in a place is hazardous before they enter the place. When entering a room, getting on a bus or a car, going shopping in a store or a mall, the present device will inform if there is any potentially hazardous particles or droplets. Another objective of the present device is provide a device that people can share the air quality information with others. By immediately uploading the local air quality information online, others can see the air quality in the places of their interest.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION

Figure 1:
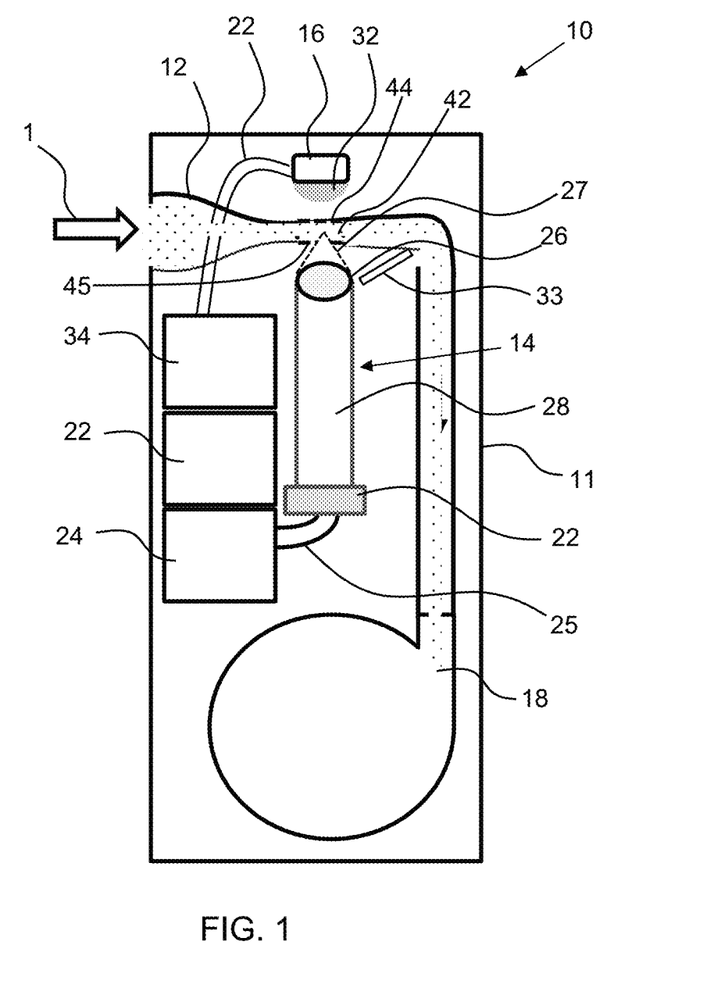
FIG. 1 shows the first embodiment of the present invention.

FIG. 1 shows the first embodiment of the present invention. The device 10 comprises of a substantially rectangular housing 11 that is configured to contain an air receiving channel 12, a microscopic imaging system 14, a lighting system 16 that can generate a short duration flash, a fan 18 that draws the air 1 into the system, a processor to control the operation of the system and a power supply. The housing also comprises of slots so that the tactile switch and the charging port for the power supply are easily accessible from the outside of the device.

Air 1 is taken into the device 10 through the intake channel 12. The fan 18 draws the air into the system. The air is guided through a channel for microscopic observation. The device is configured to be handheld or attach to the back of a mobile phone. It can have a power grip between the palm and thumb of the user's hand, while small enough to be considered portable, the housing is also long enough to fit within the optimum range for a power grip surface. The height, length and width of the device are all within the optimum range for handheld devices and it conforms to other ergonomic standards by having rounded edges and allowing a grip with all fingers on the hand. In one embodiment the device is 8 cm×16 cm×0.5 cm.

The microscopic imaging system 14 comprises of a miniature camera 22, such as a charge coupled device (CCD) or a Raspberry Pi Zero W, and a camera controller and processor 24 that is wired 25 to the camera 22. The controller is configured to allow for fast image processing. The camera has a Bluetooth and Wi-Fi connectivity built-in, allowing the device to operate wirelessly, which enhances its portability and practicality. This also allows the device to be compatible with multiple mobile device types, and removes the need for an additional cable port on the device, which allows for a smaller form factor. It is important to have high resolution camera, such as an 8 MP resolution, to be able to resolve small size drops and particles. The casing is configured to hold the camera in place with a lens 26 focusing onto the flow channel 27. The microscopic imaging may comprise an extension tube 28 that connect the camera 22 to the lens 26. The lens 26 is a biconvex lens such a small spherical glass bead, preferably a 1 mm high-quality glass bead, or a plano-convex lens. The microscope glass bead is placed in front of the camera module to achieve the required magnification. The 1 mm glass bead can achieve magnification of up to 350× if placed right on the lens and can provide more than 2000× if it is placed at the end of an extension tube away from the camera lens embodiment of the present device. In one embodiment of the present device the extension tube has fixed length, and in another embodiment of the present device, the device is configured to change the length of the extension tube and therefore, the location of the glass bead and therefore change the magnification. Use of the bead also allows the device to be affordable as they are very low cost. The camera is configured to have a specific field of view and a specific depth-of-field.

The lighting system 16 comprises of a light source 32 and a lighting controller 34. The light source is preferably a light emitting diode (LED) source, but it can be other sources such a laser light. The lighting system may also comprise of a coated mirror 33 that can reflect some of the light onto the imaging region for front lighting. The mirror is coated to only provide sufficient light onto the particles and use reflected light to illuminate the front of the particle for better morphology identification. The controller of the light source can generate very fast flashes of light (short duration flash). The short flashes are needed to capture focused images of a moving particles. A fraction of a microsecond duration flash of light is used in the order to freeze the motion of any particles in the flow. If the flash duration is long, a moving article will show as a streak in the images. Preferably an LED Chip and a MOSFET can be used to provide the required lighting to illuminate and freeze the motion of the droplets. A high-power LED Chip consumes fairly low power and provides sufficient brightness with cool white light. The MOSFET provides a higher voltage, which allows the brightness of the LED to increase.

A power source is included inside the device (not shown). Any power source, such as a UPS-Lite battery pack, can be used. A 1000 mAh polymer lithium battery is generally enough to power the system. These battery packs can be re-charged.

The fan 18 is used to draw in the ambient air into the system. A small fan, such as a 10 mm×10 mm×3 mm fan is suitable for this purpose. An axial fan can also be used to draw air from one side and eject for the other side, or a tangential inlet fan can be used to intake air tangentially and eject axially.

The flow channel 12 comprises of a focusing section 42 with a narrow flow diameter, about a 2 mm diameter section, that is configured to concentrate the flow of the air sample within the focusing zone 27 (the field of view and depth of field) of the camera. It is also designed to allow the air to flow through the channel at a speed which can be imaged without blur. The channel is transparent or has a first slot 44 for the camera to image its contents and a second slot 45 opposite for the light so that the channel can be illuminated and the motion of the droplets/particle is frozen.

Figure 2A:
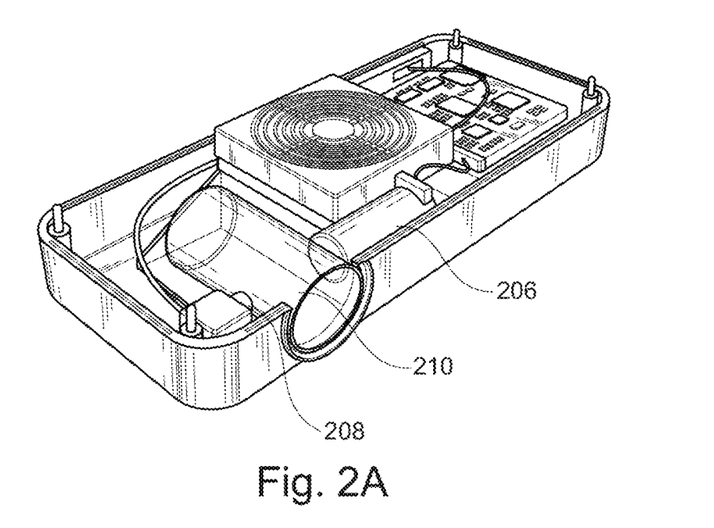
FIG. 2A shows a perspective of the second embodiment of the present invention with its top cap removed.
Figure 2B:
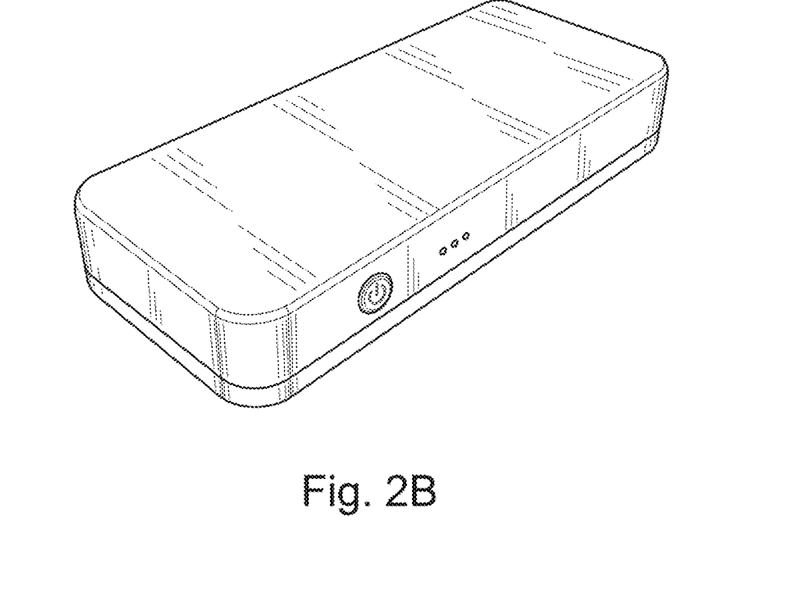
FIG. 2B shows a perspective of the second embodiment of the present invention.

FIGS. 2A-B show perspectives of another embodiment of the present device. The inlet 201 is set on one side of the device, with an outlet grid 202 on the front face of the device. The camera 206 and the light source 208 are set to image the flow inside the channel 210. FIG. 2B shows the set of tactile switches 212 and an ON/OFF switch 214 are used to control the device.

The tactile switches 212 is used to toggle the camera between its standby and active state. The tactile switch is placed at the outside of the housing so it is accessible for the end user. The power switch 214 puts the camera into a standby state in which it consumes minimal power, helping maintain the battery life of the device.

Figure 3:
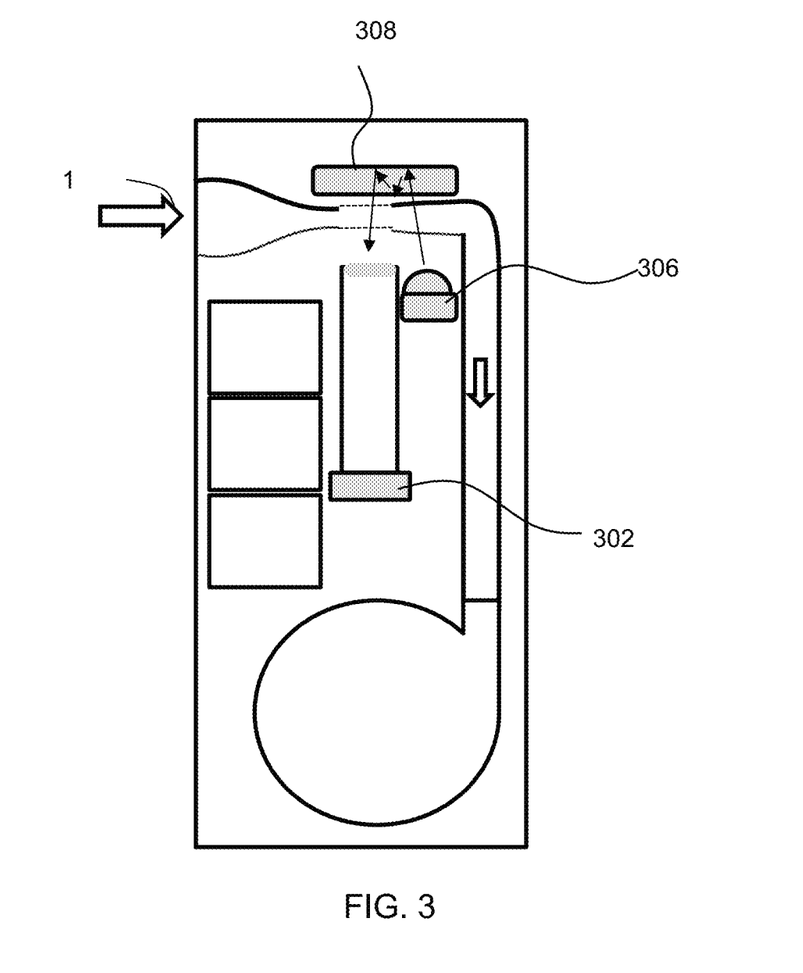
FIG. 3 shows a third embodiment of the present invention.

In the first embodiment of the present device shown in FIG. 1, the light source is located on the opposite side of the camera for backlighting and a coated mirror on the front side for reflection and front lighting. In the second embodiment of the present device shown in FIG. 3, the light source 306 is located on the same side of the camera 302. A light guide 308 is located on the opposite side of the camera 302. The light guide receives the light from the light source and channels it such that it directly illuminates the flow channel providing shadow images of the particles in the flow. This system makes the device more versatile and compact.

In the third embodiment of the present device, the device configured to remotely connect to a mobile phone and show all the results on an application on the mobile phone.

In the fourth embodiment of the present device, the device has its own monitor and shows all the results on the monitor (not shown).

Figure 4:
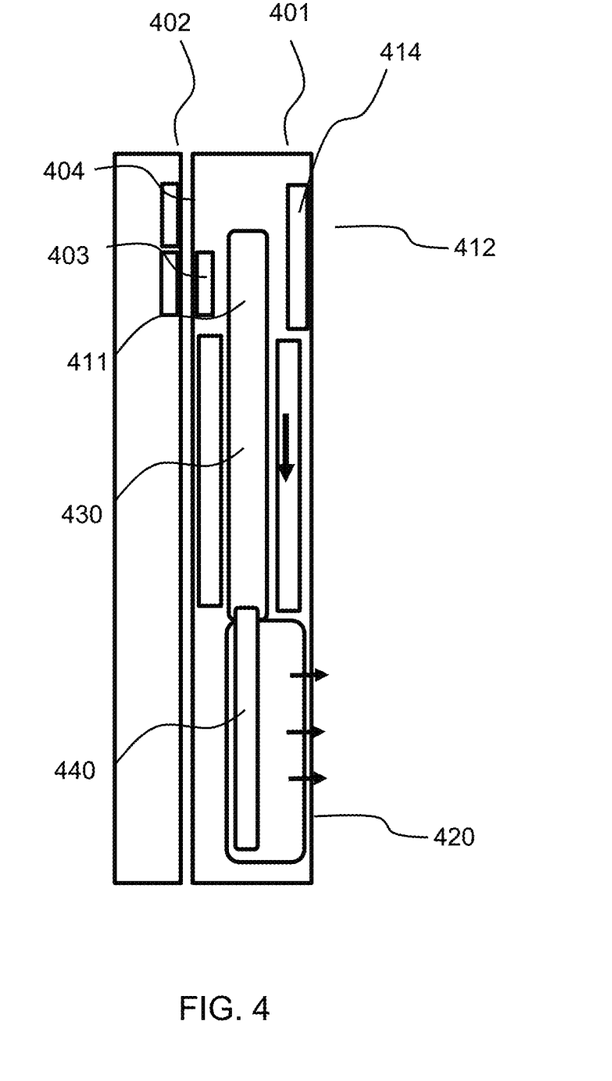
FIG. 4 shows another embodiment of the present invention that attaches to a mobile phone.
Figure 5:
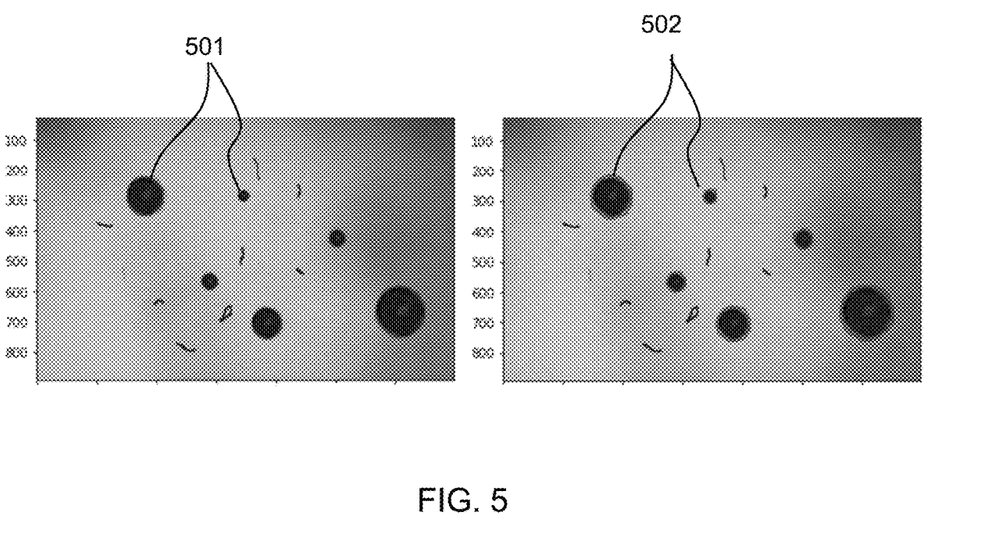
FIG. 5 shows a sample of images of droplets and edge recognition process of the image processing system of the present invention.
Figure 6:
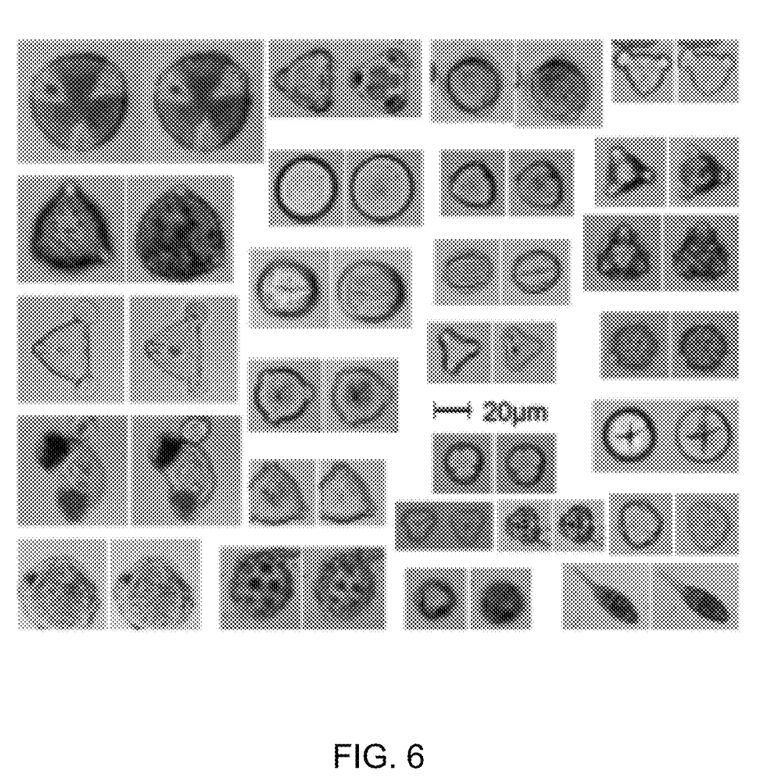
FIG. 6 shows a sample of images of particle in the library of the images in the present invention.
Figure 7:
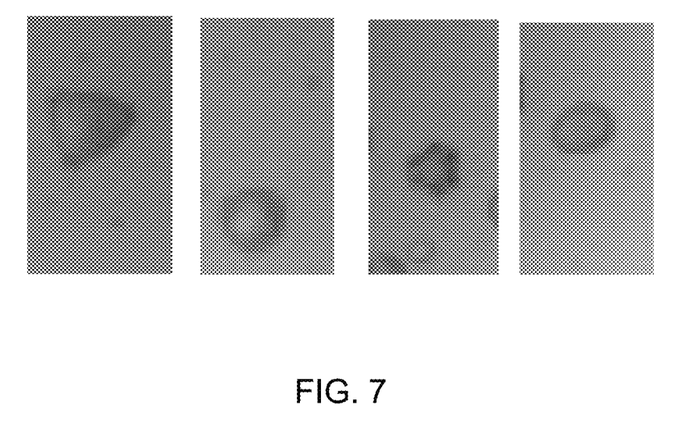
FIG. 7 shows a sample of the images of the particles taken by the imaging system.

In the fifth embodiment of the present device, as shown in FIG. 4, the device 401 is configured to attach to the back of a mobile phone 402 and use the camera 403 and the light source 404 of the mobile phone. The device comprises of a magnifying lens 411 that is configured to be placed in front of the camera of the phone 403. The device has a light guide 412 to receive the light from the phone flash and reflect it back towards the channel 414 and into the camera. Thereby taking shadow images of the particles that flow inside the channel. The fan 420 draws the air into the channel 414. The device may use the mobile processor and an app to do all its operation or have its own processor 430. It may also use the phone battery source or have its own battery source 440.

A set of images are taken, and the size and number of droplets are measured. The results are presented as a simple air quality depending on the number and size of droplets in the air. The air quality is grouped as best, better, good, average, bad, and worse based on the number of droplets in the air. The categories are relative to the average count of droplets in the environment. The results are shown as Total Particle/Droplet Count, which displays the total number of particles and droplets detected in the analysis, the distribution of different types of particles detected and sorted by count and size.

The processor comprises of an image processing software, a control software, and a Bluetooth-enabled mobile application. The image processing software can identify particles. The main processes that are achieved by the image processing software, comprise of the following: As shown in FIG. 5, the images are converted to grayscale 501; the edges 502 of the image are found; the edges are closed using dilation followed by erosion, where dilation means that the pixels around the edges are brightened, essentially expanding the edge, and erosion means that the boundaries of the edges are removed which mostly undoes the previous dilation step (this process expands to fill in any gaps around the perimeter of the droplet, making it one whole edge); findContours function to find the contours in the image which are curves following the previously found edges which form closed shapes; the perimeters and areas of the contours are found, and using a circularity formula, circular contours are obtained; these circular contours are chosen if their areas are above a threshold value; the contours are used to count the number of droplets and obtain their respective areas, and the total number of droplets and all the gathered areas is returned, and finally, each image is compared with a set of images in the system data based to identify the particular particle.

The present device provides particle morphology. The device has an automated image analysis system and is trained to identify specific particles. Machine learning technology has allowed the image processing and image recognition process to be done in a fraction of a second. This allows the system to immediately identify the particle and report to the user. Image recognition uses machine learning based algorithm to rapidly identify the particle. The system has a library of images for different particles of interest. FIG. 6 shows some examples of the pollen images in the library of the images: pine (*Pinus*), mulberry (*Morus*), birch (*Betula*), alder (*Alnus*), cedar (*Cedrus*), hazel (*Corylus*), hornbeam (*Carpinus*), horse chestnut (*Aesculus*), willow (Salix), poplar (*Populus*), plane (*Platanus*), linden/lime (*Tilia*), and olive (*Olea*), ryegrass (*Lolium* sp.) and timothy (*Phleum pratense*), ragweed (*Ambrosia*), plantain (*Plantago*), nettle/*parietaria* (Urticaceae), mugwort (*Artemisia Vulgaris*), Fat hen (*Chenopodium*), and sorrel/dock (*Rumex*).

The image processing identifies the edges of the digital image of the particle by dark pixels. A number of different image processing software can be used, including, Image J, Metamorph, Image Pro Plus, NIH Image and the like.

The device can be paired with a mobile phone, and uses its GPS system to show the air quality throughout all geographical locations and places of interest to people.

A method is used to identify a liquid droplet from a solid particle. Liquid droplets are spherical since the surface tension of the liquid forces a liquid droplet to become spherical. Therefore, a liquid droplet can be distinguished from a solid particle based on its sphericity, which translate to circularity in a two dimensional image. The shape circularity is defined as $4\pi\times$area/(square of perimeter). The closer this parameter is to 1, the closer the shape is to being a circle. Through experimental validation, a value of at least 0.85 for the circularity was determined to be a good indicator of a droplet.

A mobile application serves as the primary interaction between our device and other devices. The application sends data packets between the application and the camera with minimal energy consumption. In this application, the user can connect their phone to the device, initiate a test, and view the results.

The application consists of a Home Screen and Results Screen, and is designed to minimize the number of user interactions needed to garner a result. Overall, operating the device and beginning a test only takes two interactions. The app is configured to provide the results to a user in a simple and intuitive manner. The user will open the app and start the measurement.

The system further comprises of an artificial intelligent (AI) system to rapidly identify the morphology of the particles. The method is as provided in U.S. Pat. No. 7,218,775, which is incorporated by reference in the present system.

The device also has a network architecture that is capable of automatically collecting environment data and transferring them to a database. Our monitoring device paired with a mobile network system measures local air quality and share that data with the mobile network for others to know the information. The network architecture is capable of automatically collecting environment data and transferring them to a database. The monitoring device paired with a mobile network system measures local air quality and share that data with the mobile network for others to know the information. The use of air quality sensor networks is an important solution to assure the monitoring of the locations of high concentration of large droplets and potential zones for virus transmission. The acquired data is transmitted to a mobile computing unit expressed by a smart phone.

The present air monitoring system can also recognize metal and metal oxide particles that are generated by combustion or burning of oil in different types of engines. In most reciprocating piston engines, the cleanness of the oil is essential for the proper operation and life of the engine. One of the causes of the oil deterioration are the metal particles in the oil. As the oil circulates in the system, metal particles from various sources in the flow system may enter the flow. The current process is to sample the oil and send it to a laboratory to determine the particles content. The present monitor can be used to sample the exhaust gases from the engine and determine the number and concentration of the metal or metal oxide particles. These are indicators of the amount of the particles in the oil.

In another embodiment of the present system, an ionizer is coupled with the system to filter the air. If the air monitoring system identified harmful particles, the system turns ON and the ionizer to filter the air. An ionizer charges particles which are then attracted by a surface by electrostatic forces.

In another embodiment of the present system, a light scattering system is added in order to be able to measure submicron sizes particles. The light scattering system is similar to the U.S. Pat. No. 8,958,067 which is incorporated by reference.

In another embodiment of the present system, the device further comprises of a sensor to identify the biochemical characteristics of a droplet, differentiating potentially disease ridden droplets from other moisture droplets in the air.

The invention claimed is:

1. A portable air quality monitoring system, comprising:
   a) a housing configured to have an air inlet port, an air outlet port, and a channel configured to guide an ambient air flow through the device;
   b) a fan placed inside the housing to draw the ambient air flow into the device;
   c) a microscopic imaging system placed inside the housing and is configured to take images of the ambient air flow that contains a set of particles;
   d) a lighting system placed inside the housing and is configured to generate a short duration flash of at least 1 microsecond duration in synchronization with the microscopic imaging system to take images of the set of particles inside the ambient air flow of the channel, wherein the lighting system comprises of a light source placed on an opposite side of the microscopic imaging system for backlighting and a coated mirror placed on the same side of the microscopic imaging system for front lighting, with respect to the channel,
   e) a processor having an image processing software configured to
      i) identify a solid particle from a water droplet by determining a circularity of a particle image, wherein the circularity is defined as $4\pi$ times an area of the particle image over the square of a perimeter of the particle image and wherein a particle is identified as the water droplet if the circularity is more than 0.85,
      ii) identify a morphology of the particle by comparing the particle image with a set of predefined particle images stored in a memory of the device,
      iii) identify a size and a number of the set of particles,
      iv) report a set of air quality data, wherein the set of air quality data comprise of the morphology and a size distribution and the number of the set of particles, and
   f) a power supply and a set of tactile switches to control an operation of the device.

2. A portable air quality monitoring system, comprising:
   a) a housing configured to have an air inlet port, an air outlet port, and a channel configured to guide an ambient air flow through the device;
   b) a fan placed inside the housing to draw the ambient air flow into the device;
   c) a microscopic imaging system placed inside the housing and is configured to take images of the ambient air flow that contains a set of particles;
   d) a lighting system placed inside the housing and is configured to generate a short duration flash of at least 1 microsecond duration in synchronization with the microscopic imaging system to take images of the set of particles inside the ambient air flow of the channel, wherein the lighting system comprises of a light source placed on the same side of the microscopic imaging system for front lighting and a lightguide placed on the opposite side of the microscopic imaging system to guide the light for backlighting, with respect to the channel,
   e) a processor having an image processing software configured to
      i) identify a solid particle from a water droplet by determining a circularity of a particle image, wherein the circularity is defined as $4\pi$ times an area of the particle image over the square of a perimeter of the particle image and wherein a particle is identified as the water droplet if the circularity is more than 0.85,
      ii) identify a morphology of the particle by comparing the particle image with a set of predefined particle images stored in a memory of the device,
      iii) identify a size and a number of the set of particles,
      iv) report a set of air quality data, wherein the set of air quality data comprise of the morphology and a size distribution and the number of the set of particles, and
   f) a power supply and a set of tactile switches to control an operation of the device.

3. A portable air quality monitoring system, comprising:
   a) a housing configured to attach to a back of a mobile phone, and has an air inlet port, an air outlet port, and a channel configured to guide an ambient air flow through the device;
   b) a fan placed inside the housing to draw the ambient air flow into the device;
   c) a microscopic optics configured to be placed in front of a camera of the mobile phone and is configured to take images of a set of particle in the ambient air flow;
   d) a light guide placed inside the housing and in front of a light source of the mobile phone to reflect light back onto the channel;
   e) an application installed on the mobile phone to control the camera and the light source of the mobile phone to generate a short duration flash of at least 1 microsecond duration in synchronization with the camera to take images of the set of particles inside the ambient air flow of the channel and to
      i) identify a solid particle from a liquid droplet by determining the circularity of the particle image, wherein the circularity is defined as $4\pi$ times the area of the particle image over the square of the perimeter area of the particle image and wherein the particle is identified as a liquid droplet if the circularity is more than 0.85,
      ii) identify a morphology of a particle by comparing an image of a particle with a set of predefined images stored in the processor,
      iii) identify the size and the number of the set of particles,
      iv) report a set of air quality data, wherein the set of air quality data comprise of a morphology and a size of each particle in the set of particles and a number of the particles in the ambient air flow.

* * * * *